United States Patent Office 3,157,665
Patented Nov. 17, 1964

3,157,665
1-ALKYL-1-HYDROXY-2-PYRIDYL-
BENZ[b]CYCLOALKANES
William Laszlo Bencze, New Providence, N.J., assignor to Ciba Corporation, a corporation of Delaware
No Drawing. Filed Sept. 11, 1961, Ser. No. 137,001
3 Claims. (Cl. 260—297)

The present invention concerns 1-methylene-benz[b] cycloalkane compounds, which have in the 2-position, i.e. the position adjacent to the carbon atom carrying the methylene group, a pyridyl group and an aliphatic radical. More especially, the present invention relates to compounds of the formula:

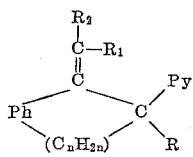

in which Ph stands for a 1,2-phenylene (o-phenylene) radical, Py represents a pyridyl group, R stands for an aliphatic radical, each of the groups $R_1$ and $R_2$ represents hydrogen, or an aliphatic radical, and the group of the formula —$(C_nH_{2n})$—, in which the letter $n$ stands for a whole number from one to seven, represents an alkylene radical and separates the 1,2-phenylene radical Ph from the carbon atom carrying the pyridyl group by Py and the aliphatic radical R by one to three carbon atoms, or salts thereof, as well as N-oxides, salts of N-oxides, quaternary ammonium derivatives of such compounds, and process for their preparation.

The 1,2-phenylene (o-phenylene) radical Ph stands for an unsubstituted 1,2-phenylene or a substituted 1,2-phenylene radical. Substituents attached to the latter are, for example, aliphatic groups, such as lower alkyl, e.g. methyl, ethyl, n-propyl, isopropyl, n-butyl and the like, substituted aliphatic groups, e.g. trifluoromethyl and the like, hydroxyl, etherified hydroxyl, particularly lower alkoxy, e.g. methoxy, ethoxy, n-propyloxy, isopropyloxy, n-butyloxy and the like, as well as lower alkenyloxy, e.g. allyloxy, 2-methyl-allyloxy and the like, lower alkylenedioxy, e.g. methylenedioxy and the like, lower cycloalkyloxy, e.g. cyclopentyloxy, cyclohexyloxy and the like, esterified hydroxyl, especially halogeno (representing hydroxyl esterified with a hydrohalic acid), e.g. fluoro, chloro, bromo and the like, mercapto, etherified mercapto, particularly lower alkyl-mercapto, e.g. methylmercapto, ethylmercapto and the like, nitro, amino, especially primary amino, as well as secondary amino, such as N-lower alkylamino, e.g. N-methylamino, N-ethylamino and the like, tertiary amino, such as N,N-di-lower alkyl-amino, e.g. N,N-dimethylamino, N-ethyl-N-methylamino, N,N-diethylamino and the like, or N-acylamino, in which acyl represents the acyl radical of an organic carboxylic acid, e.g. acetic, propionic, pivalic acid and the like, a substituted aliphatic, particularly lower alkanoic, acid, e.g. cyclohexylacetic, 3 - cyclopentylpropionic, dichloroacetic acid and the like, a carbocyclic aryl carboxylic acid, e.g. benzoic, 4-methoxy-benzoic, 3,4,5-trimethoxy-benzoic, 3,4-dichloro-benzoic, 3-N,N-dimethylamino-benzoic acid and the like, a carbocyclic arylaliphatic, especially a monocyclic carbocyclic aryl-lower alkane carboxylic acid or a monocyclic carbocyclic aryl-lower alkene carboxylic acid, e.g. phenylacetic, cinnamic acid and the like, or a heterocyclic, particularly a monocyclic heterocyclic aryl carboxylic acid, e.g. nicotinic, isonicotinic, furoic acid and the like, or any other suitable organic carboxylic acid.

Substituted 1,2-phenylene groups are, for example, lower alkyl-1,2-phenylene, e.g. methyl-1,2-phenylene (such as 3-methyl-1,2-phenylene, 4-methyl-1,2-phenylene, 4,5-dimethyl-1,2-phenylene and the like), ethyl-1,2-phenylene (such as 4-ethyl-1,2-phenylene and the like), n-propyl-1,2-phenylene (such as 4-n-propyl-1,2-phenylene and the like), isopropyl-1,2-phenylene (such as 3-isopropyl-1,2-phenylene and the like), or any other analogous lower alkyl-1,2-phenylene radical, trifluoromethyl-1,2-phenylene (such as 4-trifluoromethyl-1,2-phenylene and the like), hydroxy-1,2-phenylene (such as 3-hydroxy-1,2-phenylene, 4-hydroxy-1,2-phenylene and the like), lower alkoxy-1,2-phenylene, e.g. methoxy-1,2-phenylene (such as 3-methoxy-1,2-phenylene, 4-methoxy-1,2-phenylene, 3,4-dimethoxy-1,2-phenylene and the like), ethoxy-1,2-phenylene (such as 3-ethoxy-1,2-phenylene, 4-ethoxy-1,2-phenylene, 3,6-diethoxy-1,2-phenylene and the like), n-propyloxy-1,2-phenylene (such as 4-n-propyloxy-1,2-phenylene and the like), isopropyloxy-1,2-phenylene (such as 3-isopropyloxy-1,2-phenylene and the like), n-butyloxy-1,2-phenylene (such as 4-n-butyloxy-1,2-phenylene and the like), or any other analogous lower alkoxy-1,2-phenylene radical, lower alkenyloxy-1,2-phenylene, e.g. allyloxy-1,2-phenylene (such as 3-allyloxy-1,2-phenylene, 4-allyloxy-1,2-phenylene and the like), or any other analogous lower alkenyloxy-1,2-phenylene radical, lower alkylenedioxy-1,2-phenylene, e.g. methylenedioxy-1,2-phenylene (such as 3,4-methylenedioxy-1,2-phenylene and the like), or any other analogous lower alkylendioxy-1,2-phenylene radical, halogeno-1,2-phenylene, e.g. fluoro-1,2-phenylene (such as 3-fluoro-1,2-phenylene, 4-fluoro-1,2-phenylene and the like), chloro-1,2-phenylene (such as 3-chloro-1,2-phenylene, 4-chloro - 1,2 - phenylene, 4,5-dichloro-1,2-phenylene, 3,4,5,6 - tetrachloro-1,2 - phenylene and the like), bromo-1,2-phenylene (such as 4-bromo-1,2-phenylene, 3,6-dibromo-1,2-phenylene and the like), or any other analogous halogeno-1,2-phenylene radical, mercapto-1,2-phenylene (such as 4-mercapto-1,2-phenylene and the like), lower alkyl-mercapto-1,2-phenylene, e.g. methylmercapto-1,2-phenylene (such as 4-methylmercapto-1,2-phenylene and the like), ethylmercapto-1,2-phenylene (such as 3-ethylmercapto-1,2-phenylene and the like), or any other analogous lower alkyl-mercapto-1,2-phenylene radical, nitro-1,2-phenylene (such as 3-nitro-1,2-phenylene, 4-nitro-1,2-phenylene and the like), amino-1,2-phenylene (such as 3-amino-1,2-phenylene, 4-amino-1,2-phenylene and the like), N-lower alkyl-amino-1,2-phenylene, e.g. N - methylamino-1,2-phenylene (such as 3-N-methylamino-1,2-phenylene, 4 - N-methylamino-1,2-phenylene and the like), N-ethylamino-1,2-phenylene (such as 3-N-ethylamino-1,2-phenylene and the like), or any other analogous N-lower alkyl-amino-1,2-phenylene radical, N,N - di - lower alkyl-amino-1,2-phenylene, e.g. N,N-dimethylamino-1,2-phenylene (such as 3-N,N-dimethylamino-1,2-phenylene, 4 - N,N-dimethylamino-1,2-phenylene and the like), N-ethyl-N-methyl-amino-1,2-phenylene (such as 4-N-ethyl-N-methyl-amino-1,2-phenylene and the like), N,N- diethylamino-1,2-phenylene (such as 4-N,N-diethylamino-1,2-phenylene and the like), or any other N,N-di-lower alkyl-amino-1,2-phenylene radical, N-acyl-amino-1,2-phenylene, such as N-lower alkanoyl-amino-1,2-phenylene, e.g. N-acetylamino-1,2-phenylene (such as 4-N-acetylamino-1,2-phenylene and the like), N-pivaloylamino-1,2-phenylene (such as 4-N-pivaloylamino-1,2-phenylene and the like) as well as N-benzoylamino-1,2-phenylene (such as 4-N-benzoylamino-1,2-phenylene and the like), or any other analogous N-acyl-amino-1,2-phenylene radical, or any equivalent substituted 1,2-phenylene radical.

A pyridyl group Py represents an unsubstituted pyridyl radical, e.g. 2-pyridyl, 3-pyridyl or 4-pyridyl, as well as a substituted pyridyl radical which contain lower alkyl, e.g. methyl, ethyl, n-propyl, n-butyl and the like, lower alkoxy, e.g. methoxy, ethoxy, n-propyloxy, isopropyloxy, n-butyloxy and the like, halogeno, e.g. fluoro, chloro, bromo and the like, or any other suitable group as substituents attached to any of the positions available for substitution.

The group R, attached to the carbon atom carrying the pyridyl group, represents an aliphatic radical, particularly lower alkyl having preferably from one to four carbon atoms, especially methyl, as well as ethyl, n-propyl, isopropyl, n-butyl, secondary butyl and the like. It may also stand for a substituted aliphatic radical, for example, a carbocyclic aryl-aliphatic group, such as monocyclic carbocyclic aryl-lower alkyl, particularly phenyl-lower alkyl, e.g. benzyl, 1-phenylethyl, 2-phenylethyl and the like, or phenyl-lower alkyl, in which phenyl is substituted, for example, by lower alkyl, e.g. methyl, ethyl, isopropyl and the like, lower alkoxy, e.g. methoxy, ethoxy and the like, halogeno, e.g. fluoro, chloro, bromo and the like, or any other suitable substituent.

Each of the groups $R_1$ and $R_2$ attached to the methylene group represents hydrogen, or at least one of them stands for an aliphatic radical, particularly lower alkyl, having preferably from one to four carbon atoms, e.g. methyl, ethyl, n-propyl, isopropyl and the like, or for a substituted aliphatic radical, for example, a carbocyclic aryl-aliphatic radical, for example, monocyclic carbocyclic aryl-lower alkyl, primarily phenyl-lower alkyl, e.g. benzyl, 1-phenylethyl, 2-phenylethyl and the like, or phenyl-lower alkyl, in which phenyl is substituted, for example, by lower alkyl, e.g. methyl, ethyl, isopropyl and the like, lower alkoxy, e.g. methoxy, ethoxy and the like, halogeno, e.g. fluoro, chloro, bromo and the like, or any other suitable substituent.

The alkylene radical $-(C_nH_{2n})-$, in which the letter $n$ stands for a whole number from one to seven, and which separates the 1,2-phenylene radical and the carbon atom carrying the pyridyl group and the aliphatic radical by one to three, particularly by two, carbon atoms, may form a straight or a branched carbon chain. It is represented primarily by 1,2-ethylene, as well as by methylene, 1,1-ethylene, 1-methyl-1,2-ethylene, 2-methyl-1,2-ethylene, 1,1-propylene, 1,3-propylene, 1,3-butylene, 2,3-butylene, 1,1-isobutylene and the like. In view of the fact that the 1,2-phenylene radical and the carbon atom carrying the pyridyl group and the aliphatic radical are separated by one to three, particularly by two, carbon atoms, the compounds of the present invention are, therefore, above all 1-methylene-1,2,3,4-tetrahydro-naphthalene compounds, as well as 1-methylene-indane or 1-methylene-benzosuberan compounds, which have in the 2-position, i.e. in the position adjacent to the carbon atom carrying the methylene group, a pyridyl group and an aliphatic radical.

Salts of the compound of this invention are particularly pharmaceutically acceptable, non-toxic acid addition salts, primarily those with inorganic acids, e.g. hydrochloric, hydrobromic, nitric, sulfuric, phosphoric acids, as well as with organic acids, such as organic carboxylic acids, e.g. acetic glycolic, maleic, hydroxymaleic, dihydroxymaleic, malic, tartaric, citric, salicylic acid and the like, or organic sulfonic acids, e.g., methane sulfonic, ethane sulfonic, 2-hydroxyethane sulfonic, p-toluene sulfonic acid and the like. Salts which are primarily used for identification purposes are particularly those with acidic organic nitro compounds, e.g. picric, picrolonic, flavianic acid and the like, or with metal complex acids, e.g. phosphotungstic, phosphomolybdic, chloroplatinic, Reinecke acid and the like.

Also included within the scope of this invention are the N-oxides and the salts, particularly the pharmaceutically accepable acid addition salts of such N-oxides with the above-mentioned inorganic and organic acids.

Quaternary ammonium derivatives of the compounds of this invention are particularly those with reactive esters formed by hydroxylated compound and strong acids, such as those with lower alkyl halides, e.g. methyl, ethyl, propyl or isopropyl chloride, bromide or iodide and the like, di-lower alkyl sulfates, e.g. dimethyl sulfate, diethyl sulfate and the like, lower alkyl lower alkane sulfonates, e.g. methyl or ethyl methane sulfonate or ethane sulfonate and the like, lower alkyl monocyclic carboxylic aryl sulfonates, e.g. methyl p-toluene sulfonate and the like, phenyl-lower alkyl halides, e.g. benzyl, 1-phenylethyl or 2-phenylethyl chloride, bromide or iodide and the like. Also included as quaternary ammonium compounds are the quaternary ammonium hydroxides, and the salts obtained by reacting such quaternary ammonium hydroxides with organic or organic acids, such as with the acids used for the preparation of the previously-mentioned acid addition salts.

The compounds of the present invention may be in the form of racemates or optically active antipodes.

The compounds of this invention inhibit certain functions of the adrenal cortex which is manifested in a strong and prolonged decrease of the excretion of hydrocortisone (compound F) and corticorsterone (compound B), and a less pronounced and shorter decrease of the secretion of 11-desoxy-17α-hydroxy-corticosterone (compound S), which effects are accompanied by an immediate increase in the secretion of desoxy-corticosterone (DOC, cortexone); these effects indicate a preferential inhibition of the 11β-hydroxylase enzyme system.

The compounds of the present invention having these specific adrenal cortex inhibiting effects, can, therefore, be used as diagnostic tools for the determination of the functioning of the pituitary gland, as well as in the treatment of conditions causing adrenal cortical hyperfunction, such as Cushing's syndrome, primary aldosteronism, secondary aldosteronism and the like. Furthermore, the preferential inhibition of certain functions of the adrenal cortex makes the compounds of this invention useful as aids in the study of biosynthetic pathways of corticoid synthesis.

The compounds of the formula:

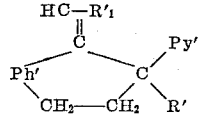

in which Ph' stands for 1,2-phenylene, lower alkyl-1,2-phenylene, hydroxy - 1,2 - phenylene, lower alkoxy - 1,2-phenylene, halogeno-1,2-phenylene, nitro-1,2-phenylene or amino-1,2-phenylene, Py' represents pyridyl, particularly 3-pyridyl or 4-pyridyl, $R_1$ represents lower alkyl, particularly methyl, and R' stands for hydrogen or lower alkyl, particularly methyl, and the pharmaceutically acceptable acid addition salts of such compounds, represent a preferred group of compounds, which show particularly outstanding adrenal inhibiting effects of the above-mentioned type.

The new compounds of this invention may be used in the form of pharmaceutical preparations, which contain the new compounds of this invention in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other carrier for pharmaceutical preparations. The latter may be in the solid form, for example, as capsules, tablets, dragees and the like, or in liquid form, for example, as solutions, suspensions, emulsions and the like. If desired, they may contain auxiliary substances such as preserving, stabilizing, wetting, emulsifying agents and the like, salts for varying the osmotic pressure, buffers, etc. They may also contain, in combination, other pharmacologically useful substances.

The compounds of this invention may be prepared according to known methods; for example, a process for their manufacture comprises eliminating water from a 1-methyl-benz[b]cycloalkan-1-ol compound, in which the carbon atom adjacent to the carbon atom with a methyl group carries a pyridyl group and an aliphatic radical, particularly from a compound of the formula

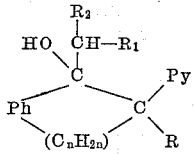

in which Ph, Py, R, $R_1$, $R_2$ and —$(C_nH_{2n})$— have the previously-given meaning, or a salt, an N-oxide or a salt of an N-oxide thereof, by dehydration, and, if desired, converting a resulting salt into the free compound or into another salt, and/or, if desired, introducing a substituent into the carbocyclic aryl, e.g. the 1,2-phenylene, portion of a resulting compound, and/or, if desired, converting a substituent attached to the carbocyclic aryl, e.g. the 1,2-phenylene, portion of a resulting compound into another substituent, and/or, if desired, converting a resulting compound into an N-oxide or a quaternary ammonium derivative thereof, and/or, if desired, converting a resulting compound or an N-oxide thereof into a salt thereof, and/or, if desired, separating a resulting mixture of isomers into the single isomers.

The elimination of water from the starting material may be achieved according to known dehydration methods, for example, by heating, or preferably by treatment with a dehydrating agent, primarily with an acidic dehydrating agent. Suitable dehydrating agents are, for example, mineral acids, e.g. hydrochloric, hydrobromic, sulfuric, phosphoric acid and the like, anhydrides of mineral acids, e.g. phosphorus pentoxide and the like, organic acids, such as organic carboxylic acids, e.g. acetic acid and the like, as well as anhydrides thereof, e.g. acetic acid anhydride and the like, or organic sulfonic acids, e.g. p-toluene sulfonic acid and the like; other useful acidic dehydrating reagents are certain salts of weak organic bases with strong inorganic acids, e.g. pyridine hydrochloride, quinoline hydrochloride and the like, or any other suitable acidic dehydrating reagent, as well as mixtures of such reagents, for example, the mixture of a mineral acid, e.g. hydrochloric acid and the like, and a suitable organic acid, e.g. acetic acid and the like. Dehydration may be achieved at room temperature, but is more efficiently accomplished at an elevated temperature. The acidic dehydration reagents may simultaneously serve as diluents; if necessary, other inert solvents may be added to ensure a complete solution. Furthermore, the reaction may be carried out in a closed vessel, and/or in the atmosphere of an inert gas, e.g. nitrogen.

The 1-methyl-benz[b]cycloalkan-1-ol compounds, particularly the compounds of the formula

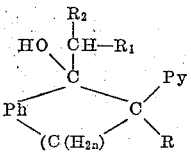

in which Ph, Py, R, $R_1$, $R_2$ and —$(C_nH_{2n})$— have the previously-given meaning, salts, N-oxides or salts of N-oxides thereof, which are used as the starting materials in the above dehydration procedure, are new and are intended to be included within the scope of this invention. Particularly useful as starting materials are the compounds of the formula

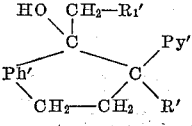

in which Ph', Py', R' and $R_1'$ have the previously-given meaning, or the acid addition salts thereof.

The starting materials may be prepared, for example, by reacting a benz[b]cycloalkan-1-one, which carries a pyridyl group and an aliphatic radical attached to the carbon atom adjacent to the carbonyl group, particularly a compound of the formula

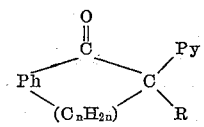

in which Ph, Py, R and —$(C_nH_{2n})$— have the previously-given meaning, with a methyl organo-metallic reagent, particularly a reagent of the formula

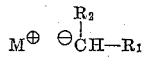

in which $R_1$ and $R_2$ have the previously-given meaning, and $M^{\oplus}$ stands for the positively charged ion of certain metals of the IA-group of the Periodic System or, more particularly, for the positively charged ion of the formula Met-Hal$^{\oplus}$, in which Met represents certain divalent metals of the IIA-group and the IIB-group of the Periodic System, and Hal stands for halogen, and, if desired, converting a resulting salt into the free compound, and/or, if desired, introducing into the carbocyclic aryl, e.g. 1,2-phenylene, portion of a resulting compound a substituent, and/or, if desired, converting in a resulting compound a substituent attached to the carbocyclic aryl, e.g. 1,2-phenylene portion into another substituent, and/or, if desired, converting a resulting compound into a salt, an N-oxide or a salt of an N-oxide thereof.

The ion $M^{\oplus}$ represents primarily the positive ion of an alkali metal, such as sodium, or particularly lithium, or, more especially, the positive ion of the formula Mg-Hal$^{\oplus}$, in which Hal represents halogeno, e.g. chloro, bromo, iodo and the like. Both types of reagents are used under similar conditions; preferably, the alkali metal compound or the Grignard reagent is prepared separately and is then reacted with the ketone. The solvent used during the preparation of the reagent, especially the Grignard reagent, for example, a di-lower alkyl ether, particularly diethyl ether, may be diluted or replaced by other solvents, for example, by other ethers, such as monocyclic carbocyclic aryl lower alkyl ethers, e.g. anisole and the like, bis-monocyclic carbocyclic aryl ethers, e.g. diphenyl ether and the like, cyclic ethers, e.g. tetrahydrofuran, p-dioxane and the like, organic bases, e.g. pyridine, N-methyl-morpholine and the like, monocyclic carbocyclic aryl hydrocarbons, e.g. benzene, toluene, xylene and the like, or aliphatic hydrocarbons, e.g. pentane, hexane and the like, or any other suitable solvent. The reaction may be carried out while cooling, at room or at an elevated temperature; if necessary, the atmosphere of an inert gas, e.g. nitrogen, may be required, particularly when an alkali metal reagent is used. The resulting reaction mixture may be worked up according to known methods. Thus, a complex resulting from the reaction of a ketone with a Grignard reagent may be broken, for example, by adding a weak acid, such as an aqueous solution of ammonium chloride and the like, to the reaction mixture, and the desired product may then be isolated according to standard procedures.

The intermediates used in the above reaction may be prepared according to known methods; for example, the salt of a functional derivative of a pyridyl-acetic acid, particularly an alkali metal salt of a compound of the formula

in which Py has the previously-given meaning, $R_a$ stands for hydrogen or an aliphatic radical, and $R_0'$ represents a functionally converted carboxyl group, is reacted with a reactive ester of a phenyl-lower alkanol, particularly with a compound of the formula

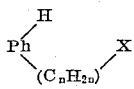

in which Ph, $n$ and the group of the formula —$(C_nH_{2n})$— have the previously-given meaning, and X represents a reactively esterified hydroxyl group, particularly a halogeno atom, if necessary, a functionally converted carboxyl group in a resulting compound is converted into the free carboxyl group or into another functionally converted carboxyl group, and a resulting phenyl-alkane carboxylic acid, which contains a pyridyl group attached to the carbon atom adjacent to the carboxyl group, or a functional derivative of such carboxylic acid, particularly a compound of the formula:

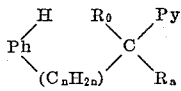

in which ph, Py, $R_a$, $n$ and the group of the formula —$(C_nH_{2n})$— have the previously-given meaning, and $R_0$ stands for a carboxyl group or a functionally converted carboxyl group, or a salt, an N-oxide or a salt of an N-oxide of such compound, is treated with a strong Lewis acid ring closing reagent, and, if necessary, in a resulting compound having a hydrogen attached to the carbon atom carrying the pyridyl group, such hydrogen is replaced by an aliphatic radical.

The several steps of the above procedure are carried out according to known methods. A salt of a functional derivative of a pyridyl-acetic acid is primarily an alkali metal salt, e.g. lithium, sodium, potassium and the like, salt; the latter may be prepared, for example, by treatment with an alkali metal, e.g. sodium and the like, an alkali metal hydroxide, e.g. lithium hydroxide, sodium hydroxide, potassium hydroxide and the like, an alkali metal hydride, e.g. sodium hydride and the like, an alkali metal amide, e.g. sodium amide, potassium amide and the like, an alkali metal lower alkanolate, e.g. sodium or potassium methanolate, ethanolate, n-butanolate, tertiary butanoliate and the like, or any other suitable reagent, using appropriate inert solvents as diluents. A functionally converted carboxyl group as represented by $R_0'$ is primarily a cyano group; the salt of a functional derivative of a pyridyl acetic acid, therefore, primarily a salt, particularly an alkali metal salt of a pyridyl-acetonitrile having the formula:

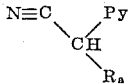

in which Py and $R_a$ have the previously-given meaning.

The reactively esterified hydroxyl group of the second reagents, as represented by X in the above formula, is primarily a hydroxyl group esterified with a strong inorganic acid, particularly mineral acid, e.g. hydrochloric, hydrobromic, hydroiodic sulfuric acid and the like, or a strong organic sulfonic acid, e.g. p-toluene sulfonic acid. Such group, is, therefore, above all a halogeno atom, e.g. chloro, bromo, iodo and the like, as well as any other analogous, reactively esterified hydroxyl group. These compounds may be prepared, for example, by treating the corresponding phenyl-lower alkanol with an appropriate reagent capable of converting a free hydroxyl group into a reactively esterified hydroxyl group, particularly a halogeno group, for example, by treatment with a thionyl halide, e.g. thionyl chloride and the like; a phosphorus halide, e.g. phosphorus tribromide and the like, or any other suitable reagent.

The reaction of the salt of a functionally converted pyridyl-acetic acid and the reactive ester of a phenyl-lower alkanol is carried out according to known methods, preferably in the presence of an inert solvent, for example, toluene, N,N-dimethylformamide and the like, and if necessary, while cooling or heating, and/or in the atmosphere of an inert gas, e.g. nitrogen.

A functionally converted carboxyl group in the resulting starting material is converted into a free carboxyl or another functionally converted carboxyl group, represented by $R_0$ in the above formula, according to known methods. For example, a cyano group may be converted into a carbamyl group or a free carboxyl group by treatment with an aqueous solution of an alkali metal hydroxide, e.g. sodium hydroxide and the like. The group $R_0$ is preferably a free carboxyl group, but may also stand for a functionally converted carboxyl group, such as, for example, carbamyl, as well as carbo-lower alkoxy, e.g. carbomethoxy, carbethoxy and the like halogeno-carbonyl, e.g. chlorocarbonyl and the like.

The ring closure to the desired intermediate may be effected by treating the starting material with a strong Lewis acid ring closure reagent selected from the group of Friedel-Crafts reagents, such as, for example, polyphosphoric acid, stannic chloride, aluminum chloride, sulfuric acid, hydrochloric acid, boron trifluoride and the like. If necessary, the mixture of the starting material and the ring closing reagent is diluted with an appropriate inert solvent, the selection of which depends largely on the solubility capacity of the starting material and the nature of the ring closing reagent; preferred inert solvents are, for example, benzene, toluene, hexane, carbon disulfide, diethyl ether and the like. The reaction is preferably carried out at an elevated temperature, if necessary, in a closed vessel and/or in the atmosphere of an inert gas, e.g. nitrogen.

In a resulting intermediate, which has a hydrogen attached to the carbon atom carrying the pyridyl group, such hydrogen may be replaced by an aliphatic group; in other words, the group $R_a$ in the above formulae, whenever representing hydrogen, may be replaced by an aliphatic radical. The replacement may be carried out according to any known methods. For example, a salt, particularly an alkali metal salt, may be formed by treating a resulting benz[b]cycloalkan-1-one with a salt-forming, e.g. alkali metal salt-forming reagent, such as for example, an alkali metal, e.g. lithium, sodium, potassium, or an alkali metal, e.g. lithium, sodium, potassium and the like, hydride, amide, lower alkanolate, such as methanolate, ethanolate, tertiary butanolate and the like, in the presence of an appropriate inert solvent, and reacting the resulting metal, particularly alkali metal, salt with a reactive ester of an aliphatic alcohol, particularly of a lower alkanol, such as an aliphatic halide, especially a lower alkyl halide, e.g. methyl, ethyl, n-propyl, isopropyl, n-butyl, isobutyl, secondary butyl chloride, bromide or iodide and the like, or a substituted aliphatic halide, such as a phenyl-lower alkyl halide, e.g. benzyl, 1-phenylethyl or 2-phenylethyl chloride, bromide or iodide and the like. The introduction of an aliphatic radical R may be carried out while cooling, at room temperature or at an elevated temperature, and/or, if necessary, in a closed vessel and/or in the atmosphere or an inert gas, e.g. nitrogen.

The compounds of this invention may also be prepared by reacting a benz[b]cycloalkan-1-one, which has a pyridyl group and an aliphatic radical attached to the carbon atom adjacent to the carbonyl group, particularly a compound of the formula

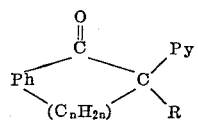

in which Ph, Py, R and —$(C_nH_{2n})$— have the previously-given meaning, with a tri-carbocyclic aryl-methylene-phosphorane reagent, and, if desired, carrying out the optional steps.

The reaction is carried out according to the known Wittig reaction. A tri-carboxylic aryl-methylene-phosphorane reagent (a so-called Wittig reagent) is more especially a methylene-tri-monocyclic carbocyclic aryl-phosphorane compound, such as a methylene-triphenyl-phosphorane compound having the following formula

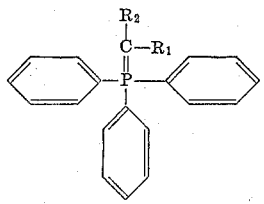

in which $R_1$ and $R_2$ have the previously-given meaning. Such reagent is prepared, for example, by reacting a tricarbocyclic aryl-phosphine, such as a tri-monocyclic carbocyclic aryl-phosphine, particularly triphenylphosphine, with a methyl halide, particularly a compound of the formula $R_1(R_2)CH$—Hal, in which $R_1$ and $R_2$ have the previously-given meaning, and Hal represents halogeno, particularly bromo, as well as chloro or iodo, and treating a resulting methyl-tri-carbocyclic aryl-phosphonium halide, such as a methyl-tri-monocyclic carbocyclic aryl-phosphonium halide, particularly a methyl-triphenyl-phosphonium halide of the formula

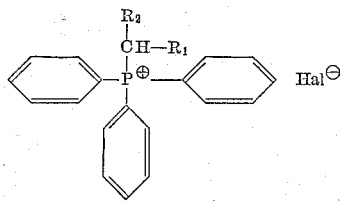

in which $R_1$, $R_2$ and Hal have the previously-given meaning, with an equivalent amount of a suitable base capable of eliminating hydrogen halide from the methyl-tri-carbocyclic aryl-phosphonium halide, such as a suitable alkali metal organic compound, for example, a lower alkyl alkali metal compound, e.g. n-butyl lithium and the like. The preparation of the desired reagent is carried out according to known methods; the methylene-tri-carbocyclic aryl-phosphoran reagent is preferably not isolated, but can be used in solution with the inert solvent, e.g. tetrahydrofuran and the like, present during its preparation. Generally, the reagent and the benz[b]cycloalkan-1-one are combined at room temperature, preferably in the atmosphere of an inert gas, e.g. nitrogen, and/or in a closed vessel; if necessary, heating may be required to complete the reaction.

The starting material used in the above reaction is prepared as previously shown.

A substituent may be introduced into the 1,2-phenylene portion of a resulting compound. For example, upon nitration with a suitable nitrating reagent a nitro group may be introduced into the aromatic portion.

Certain substituents attached to the 1,2-phenylene portion of the resulting compounds may be converted into other substituents. For example, a nitro group may be reduced to an amino group according to known reduction methods, for example, by controlled treatment with hydrogen in the presence of a suitable catalyst, e.g. palladium on charcoal and the like, and of an inert solvent, e.g. p-dioxane and the like. An amino group may be converted into a halogeno atom by diazotization, followed by treatment with a cuprous halide according to the Sandmeyer reaction. Or, a lower alkoxy, e.g. methoxy and the like, group may be converted into a free hydroxyl group, for example, by acidic hydrolysis with hydrobromic acid in the presence of acetic acid and the like.

A resulting salt may be converted into the free base, for example, by treatment with a base, such as, for example, an alkali metal hydroxide, e.g. lithium hydroxide, sodium hydroxide, potassium hydroxide and the like, an alkali metal carbonate, e.g. lithium, sodium or potassium carbonate or hydrogen carbonate and the like, ammonia or any other suitable base, or with an anion exchange resin and the like.

A resulting salt may be converted into another salt according to known methods, for example, by treatment with an appropriate salt, e.g. sodium, potassium, silver and the like, salt of an acid, such as of one of the above described acids, preferably in the presence of a suitable inert solvent.

A resulting free base may be converted into its acid addition salts by reacting the former with an acid, such as one of those mentioned hereinbefore, for example, by treating a solution of the base in a suitable inert solvent or solvent mixture with the acid or a solution thereof and isolating the desired salt. Salts may also be obtained in the form of hydrates, e.g. hemihydrates, monohydrates, sesquihydrates or polyhydrates, or may contain solvent of crystallization depending on the conditions used in the formation of the salts.

An N-oxide of a resulting compound may be prepared according to known methods, for example, by treatment with a peracid, particularly an organic carboxylic peracid, e.g. peracetic, perbenzoic, perphthalic acid and the like, or any other suitable peracid, as well as with other N-oxidation reagents, i.e. hydrogen peroxide and the like, preferably in an inert solvent.

The compounds of this invention may be converted into their quaternary ammonium derivations, for example, by reacting them with a reactive ester formed by a hydroxylated compound and a strong acid. Such reactive esters are, for example, those previously mentioned yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g. nitrogen. A resulting quaternary ammonium compound may be converted into the corresponding quaternary ammonium hydroxide, for example, by reacting a quaternary ammonium halide with silver oxide, or a quaternary ammonium sulfate with barium hydroxide, or by treating a quaternary ammonium salt with an anion exchanger, or by electrodialysis. From a resulting quaternary ammonium base there may be prepared other quaternary ammonium salts with acids, for example, with those outlined hereinbefore for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be obtained as hydrates.

The new compounds of this invention may be obtained in the form of mixtures of racemates, which mixtures may be separated into the individual racemates on the basis of physico-chemical differences, such as solubility and the like, for example, by fractional crystallization, fractional distillation and the like.

Racemates of the compounds of this invention may be resolved into the optically active d- and l-forms according to known procedures used for the resolution of racemic compounds. For example, the free base of a racemic d,l-compound, dissolved in an appropriate solvent, such as a lower alkanol, e.g. methanol, ethanol and the like, a halogenated aliphatic hydrocarbon, e.g. methylene chloride, chloroform and the like, or any other suitable diluent, may be treated with one of the optically active forms of an acid containing an asymmetric carbon atom or a solution thereof, for example, in one of the previously-mentioned diluents. Especially useful as optically active forms of salt forming acids having an asymmetric carbon atom are D-tartaric (also *l*-tartaric) and L-tartaric (also *d*-tartaric) acid, as well as the optically active forms of malic, mandelic, camphor-10-sulfonic, quinic, di-o-toluyl-tartaric acid and the like. A salt may then be isolated, which is formed by the optically active acid with the optically active form of the base. From a resulting salt, the free and optically active base may be obtained according to known methods, such as outlined hereinbefore, and an optically active base may be converted into a therapeutically useful acid addition salt with an acid such as one of those mentioned hereinbefore. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following example is intended to illustrate the invention and is not to be construed as being a limitation thereon. Temperatures are given in degrees centigrade.

*Example*

A solution of 1.0 g. of 1,2-dimethyl-2-(3-pyridyl)-1,2,3,4-tetrahydro-naphthalen-1-ol in 15 ml. of concentrated hydrochloric acid is heated to reflux for one hour. The reaction mixture is then cooled, diluted with water, neutralized with a 40 percent aqueous solution of sodium hydroxide and the pH adjusted to 8 by adding solid sodium carbonate. The organic material is extracted three times with diethyl ether, the combined extracts are washed with a saturated aqueous solution of sodium chloride, dried over sodium sulfate, filtered and evaporated to dryness. The remaining yellow oil is distilled to yield the desired 2 - methyl - 1-methylene-2-(3-pyridyl)-1,2,3,4-tetrahydronaphthalene of the formula

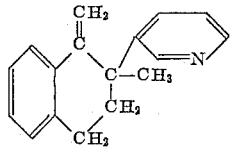

which is collected at 115–120°/0.02 mm.; yield: 0.82 g. of colorless oil.

The starting material used in the above procedure may be prepared as follows: To an ice-bath cooled solution of 25.7 g. (0.218 mol) of 3-pyridyl-acetonitrile in 150 ml. of N,N-dimethylformamide is added in small portions 10.49 g. of a 53 percent suspension of sodium hydride in mineral oil (0.218 mol) while stirring. The mixture is agitated at room temperature until hydrogen evolution ceases and is then again cooled in an ice-bath. A solution of 40.2 g. (0.218 mol) of 2-bromoethyl-benzene in 150 ml. of toluene is added in a slow stream; the resulting mixture is stirred for three hours at room temperature and then allowed to stand overnight at room temperature. The inorganic material (sodium bromide) is filtered off, the filtrate is evaporated to a total volume of 100 ml., and diluted with water. The organic material is extracted with three portions of diethyl ether, the organic solutions are washed with a saturated aqueous sodium chloride solution, dried over sodium sulfate, filtered and evaporated to dryness. The residue is distilled to yield 30.8 g. of a yellow oil representing 4-phenyl-2-(3-pyridyl)-butyronitrile B.P. 143–150°/0.01 mm.

To a solution of 15.0 g. of 4-phenyl-2-(3-pyridyl)-butyronitrile in 60 ml. of ethanol (95 percent strength) is added a solution of 30 g. of sodium hydroxide in 30 ml. of water, and the mixture is refluxed for 64 hours. The organic solvent is evaporated under reduced pressure, more water is added and the pH is adjusted to 5 with 2 N aqueous hydrochloric acid and aqueous acetic acid. The mixture is extracted three times with diethyl ether; the organic extracts are washed with a saturated aqueous sodium chloride solution, dried over sodium sulfate and evaporated to dryness. The acetic acid remaining in the residue is driven off by blowing air over the surface of the oily product. 14.0 g. of 4-phenyl-2-(3-pyridyl)-butyric acid is recovered; the product melts at 106–108° and is recrystallized from a mixture of ethanol and water, M.P. 110–112.5°.

11 g. of 4-phenyl-2-(3-pyridyl)-butyric acid is stirred into 55 g. of polyphosphoric acid, preheated at 90°. The temperature is elevated to 105–110° and maintained at that level for 25 minutes. The resulting clear solution is stirred into ice-water, the mixture is neutralized with 50 percent aqueous sodium hydroxide while keeping the temperature below 40°. The pH is adjusted to 8 by adding sodium carbonate, and the resulting crystalline precipitate is filtered off and taken up in diethyl ether. The organic solution is washed with water and saturated aqueous sodium chloride solution, dried over sodium sulfate, filtered and evaporated to dryness to yield 9.3 g. of the colorless crystalline 2-(3-pyridyl)-1,2,3,4-tetrahydro-naphthalen-1-one, which is purified by recrystallization from a mixture of ethanol and water, and melts at 79–80°; the infrared absorption spectrum shows the characteristic conjugated carbonyl band at 1688 cm.$^{-1}$.

To a solution of 2.0 g. of 2-(3-pyridyl)-1,2,3,4-tetrahydro-naphthalen-1-one in 25 ml. of N,N-dimethylformamide is added in small portions 0.43 g. of a 53 percent mineral oil suspension of sodium hydride while cooling in an ice-bath. The temperature is allowed to rise until the hydrogen evolution ceases, cooling is then continued and a solution of 1.28 g. of methyl iodide in 15 ml. of N,N-dimethylformamide is added. Cooling is discontinued and the reaction mixture is stirred for three hours at room temperature and then allowed to stand overnight. Benzene is added, the solid material is filtered off, the filtrate is evaporated to dryness and the residue is taken up in water. The organic material is extracted with diethyl ether, the organic solution is washed with a saturated aqueous solution of sodium chloride and dried over sodium sulfate, filtered and evaporated. The 2-methyl-2-(3-pyridyl) - 1,2,3,4 - tetrahydro-naphthalen-1-one is purified by distillation, B.P. 129–131°/0.03 mm.; yield: 1.3 g.

A Grignard reagent, prepared from 14.2 g. of methyl iodide and 2.43 g. of magnesium in 50 ml. of diethyl ether, after the initial exothermic reaction subsides, is refluxed for one hour. After cooling to about 15°, a solution of 6.0 g. of 2-methyl-2-(3-pyridyl)-1,2,3,4-tetrahydro-naphthalen-1-one in 25 ml. of benzene is added dropwise while stirring. The reaction mixture is refluxed for four hours, allowed to stand at room temperature for 16 hours, again heated to reflux for one hour and then cooled with an ice-bath. Water is added dropwise until the milky organic layer is cleared and a saturated aqueous solution of ammonium chloride is added. A solid material, suspended between the organic and inorganic liquid layers, is collected, dried (yield: 1.5 g.) and recrystallized from a mixture of ethanol and water, M.P. 190.5–192°. The organic layer is separated, the aqueous layer is extracted four times with ethyl acetate and the combined organic solutions are washed with an aqueous sodium chloride solution, dried over sodium sulfate, filtered and evaporated to dryness. 4.9 g. of a solid material is recovered, which is recrystallized from a mixture of ethanol and water, M.P. 135–148°, which represents a mixture of a low-melting form and the high melting form, previously isolated and melting at 190.5–192°, of 1,2-dimethyl-2-(3-pyridyl) - 1,2,3,4 - tetrahydro-naphthalen-1-ol of the formula

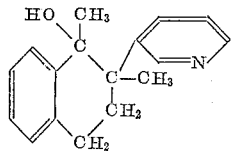

which is used as the starting material without further purification.

Other compounds prepared according to the above described procedure are, for example, 2-ethyl-1-methylene-2-(3-pyridyl) - 1,2,3,4 - tetrahydro-naphthalene, 2-isopropyl-1-methylene-2-(3-pyridyl) - 1,2,3,4 - tetrahydro-naphthalene, 2-methyl-1-methylene - 2 - (4-pyridyl) - 1,2,3,4-tetrahydro-naphthalene, 6-chloro-2-methyl-1-methylene-2-(3-pyridyl) - 1,2,3,4 - tetrahydro-naphthalene, 7-chloro-2-ethyl-1-methylene-2-(3-pyridyl) - 1,2,3,4-tetrahydro-naphthalene, 8-chloro-2-ethyl-1-methylene-2-(3-pyridyl)-1,2,3,4-tetrahydro - naphthalene, 6-methoxy-2-methyl-1-methylene-2-(3-pyridyl)-1,2,3,4-tetrahydro-naphthalene, 1-ethylidene-2-methyl-2-(3-pyridyl) - 1,2,3,4 - tetrahydro-naphthalene, 2-methyl-1-methylene - 2 - (3-pyridyl)-indane, 2-methyl-1-methylene-2-(3-pyridyl)-benzosuberane and the like.

What is claimed is:

1. A member selected from the group consisting of a compound of the formula

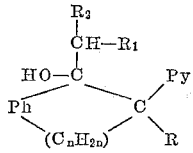

in which Ph is a member selected from the group consisting of 1,2-phenylene, lower alkyl-1,2-phenylene, hydroxy-1,2-phenylene, lower alkoxy - 1,2 - phenylene, halogeno-1,2-phenylene, nitro - 1,2 - phenylene and amino-1,2-phenylene, Py is pyridyl, R stands for lower alkyl, each of the groups $R_1$ and $R_2$ stands for a member selected from the group consisting of hydrogen and lower alkyl, and the group of the formula —$(C_nH_{2n})$—, in which the letter $n$ stands for a whole number from one to seven, stands for alkylene and separates Ph from the carbon atom carrying Py and R by one to three carbon atoms, an acid addition salt thereof, an N-oxide thereof, and an acid addition salt of an N-oxide thereof.

2. A compound of the formula

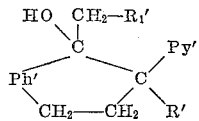

in which Ph′ stands for 1,2-phenylene, Py′ is pyridyl, R′ stands for lower alkyl, and $R_1′$ is hydrogen.

3. 1,2-dimethyl-2-(3-pyridyl) - 1,2,3,4-tetrahydro-naphthalen-1-ol.

References Cited in the file of this patent

UNITED STATES PATENTS

| 2,750,392 | Cislak | June 12, 1956 |
| 2,970,149 | Huebner | Jan. 31, 1961 |
| 2,982,783 | Schenck et al. | May 2, 1961 |
| 2,991,287 | Fallon et al. | July 4, 1961 |
| 2,993,050 | Gleason et al. | July 18, 1961 |

OTHER REFERENCES

Tilford et al.: J.A.C.S., vol. 70, p. 4007 (1948).